(12) United States Patent
Dallmeier

(10) Patent No.: US 11,908,294 B2
(45) Date of Patent: Feb. 20, 2024

(54) HOLDING ASSEMBLY AND METHOD FOR SUSPENDED MOUNTING OF AN OBJECT, IN PARTICULAR A SECURITY CAMERA

(71) Applicant: Dallmeier electronic Gmbh & Co. KG, Regensburg (DE)

(72) Inventor: Dieter Dallmeier, Pettendorf (DE)

(73) Assignee: Dallmeier electronic GmbH & Co. KG, Regensburg (DE)

(*) Notice: Subject to any disclaimer, the term of this patent is extended or adjusted under 35 U.S.C. 154(b) by 26 days.

(21) Appl. No.: 17/597,592

(22) PCT Filed: Jun. 30, 2020

(86) PCT No.: PCT/EP2020/068322
§ 371 (c)(1),
(2) Date: Jan. 12, 2022

(87) PCT Pub. No.: WO2021/032346
PCT Pub. Date: Feb. 25, 2021

(65) Prior Publication Data
US 2022/0246006 A1  Aug. 4, 2022

(30) Foreign Application Priority Data
Aug. 20, 2019 (DE) .................... 10 2019 122 373.3

(51) Int. Cl.
*G08B 13/196* (2006.01)
*F16M 11/14* (2006.01)

(52) U.S. Cl.
CPC ....... *G08B 13/19632* (2013.01); *F16M 11/14* (2013.01)

(58) Field of Classification Search
CPC .............................. G08B 13/19632; F16M 11/14
See application file for complete search history.

(56) References Cited

U.S. PATENT DOCUMENTS 5,201,896 A * 4/1993 Kruszewski ........... F16M 11/10
248/278.1
5,204,742 A * 4/1993 Nordmann ......... G08B 13/1963
348/373
(Continued)

FOREIGN PATENT DOCUMENTS

CN  101095268 A  12/2007
CN  201878248 U   6/2011
(Continued)

OTHER PUBLICATIONS

First Examination Report in corresponding application No. 2020334965 in Australia, dated Dec. 1, 2022.
(Continued)

*Primary Examiner* — Monica E Millner
(74) *Attorney, Agent, or Firm* — WELSH FLAXMAN & GITLER LLC

(57) ABSTRACT

The invention relates to a holding assembly for suspended mounting of an object, in particular a security camera, on a ceiling or wall, including at least one holding device and at least one retaining pin which is connected to the object and extends along a longitudinal axis (LA), wherein the holding device has at least one fastening portion, for fastening the holding device to the ceiling or wall, and a receiving portion, which is opposite the fastening portion and has a receiving axis (AA), for at least partially receiving the retaining pin, wherein the object can be mounted on the receiving portion so as to be suspended by the retaining pin. The holding assembly is secured in the receiving portion at least against axial displacement, by a catch mechanism.

15 Claims, 9 Drawing Sheets

(56) References Cited

U.S. PATENT DOCUMENTS

| | | | | |
|---|---|---|---|---|
| 5,689,304 | A * | 11/1997 | Jones | G08B 13/19632 348/E7.086 |
| 6,328,270 | B1 * | 12/2001 | Elberbaum | F16L 27/04 403/27 |
| 6,354,749 | B1 * | 3/2002 | Pfaffenberger, II | G08B 13/19632 396/428 |
| 6,476,856 | B1 * | 11/2002 | Zantos | G08B 13/19632 348/E5.026 |
| 7,192,303 | B2 * | 3/2007 | Kohen | H02G 3/20 439/537 |
| 7,217,045 | B2 * | 5/2007 | Jones | G08B 13/1963 348/E5.026 |
| 7,445,186 | B2 * | 11/2008 | Kuhn | F16M 13/027 248/343 |
| 7,462,066 | B2 * | 12/2008 | Kohen | H01R 13/6276 439/537 |
| 8,167,506 | B2 * | 5/2012 | Martos | G03B 15/00 396/427 |
| 8,821,045 | B1 * | 9/2014 | De Pape | G08B 13/19617 348/143 |
| 9,436,067 | B2 * | 9/2016 | Chen | G03B 17/561 |
| 10,844,997 | B1 * | 11/2020 | Loew | F16M 13/00 |
| 11,133,632 | B2 * | 9/2021 | Kohen | F21K 9/20 |
| 11,460,184 | B2 * | 10/2022 | Kohen | F21V 21/02 |
| 2001/0022627 | A1 * | 9/2001 | Bernhardt | G08B 13/19619 348/E7.087 |
| 2003/0053806 | A1 * | 3/2003 | Schneider | G08B 13/1963 396/427 |
| 2017/0168376 | A1 * | 6/2017 | Adervall | H04N 7/183 |
| 2017/0205687 | A1 * | 7/2017 | Mitchell | F16M 11/105 |
| 2019/0004401 | A1 | 1/2019 | Wilson et al. | |
| 2019/0236919 | A1 * | 8/2019 | Mehdi | H04N 23/57 |
| 2020/0096842 | A1 * | 3/2020 | Ramones | F16M 13/00 |

FOREIGN PATENT DOCUMENTS

| | | |
|---|---|---|
| DE | 10249847 B4 | 5/2004 |
| RU | 2481939 C2 | 5/2013 |

OTHER PUBLICATIONS

EPO Examination Report in corresponding application No. 20736298.8-1205 dated Aug. 2, 2023.

* cited by examiner

HOLDING ASSEMBLY AND METHOD FOR SUSPENDED MOUNTING OF AN OBJECT, IN PARTICULAR A SECURITY CAMERA

FIELD OF THE INVENTION

The invention relates to a holding assembly for suspended mounting of an object, in particular a security camera, having at least one holding device and at least one retaining pin connected to the object, wherein the holding device has at least one fastening portion for fastening the holding device to the ceiling or wall, and a receiving portion opposite the fastening portion for at least partially receiving the retaining pin, wherein the object can be mounted on the receiving portion so as to be suspended by the retaining pin. This invention further relates to a method for suspended mounting of an object, in particular a security camera, on a ceiling or wall by means of a holding assembly, wherein a holding device of the holding assembly is fastened to the ceiling or wall with a fastening portion of the holding device and a retaining pin connected to the object is introduced into a receiving portion of the holding device.

BACKGROUND OF THE INVENTION

Holding assemblies for mounting objects, in particular security cameras, are well-known from the prior art. For example, PCT Publication No, WO 2014/197964 A1 discloses a fastening system for fastening a camera, in particular a security camera, to a bracket fixed in the ceiling. The camera has a housing, on which a spring-actuated clamping unit is arranged, which allows the camera to be fastened in the ceiling relatively quickly.

Furthermore, Chinese Patent No. 201514533 U describes a simple mounting unit for a camera. This mounting unit comprises a holding bracket that can be mounted to the wall, wherein the camera can be fastened to the holding bracket by a screw connection. To prevent the camera from falling down during the mounting process, the camera is also fastened to the holding bracket by an elastic rope.

A typical problem of these prior art solutions is the fact that the mounting of the objects, in particular the security cameras, requires steps that a single person either cannot perform at all or only with great difficulty.

In spite of the solutions known from the prior art, the simple, quick and secure mounting of an object, in particular a security camera, on a ceiling or wall, preferably performable by one single person, is still a key goal in the development of holding assemblies and methods for suspended mounting of an object, in particular a security camera.

SUMMARY OF THE INVENTION

It is therefore the object of the present invention to provide a holding assembly and a method for suspended mounting of an object, in particular a security camera, which overcome the disadvantages of the prior art and in particular enable a simple, quick and secure mounting of the object, preferably performable by one single person. According to the invention, this problem is solved by a holding assembly and a method for suspended mounting of an object, in particular a security camera.

What is proposed is a holding assembly for suspended mounting of an object on a ceiling or wall, in particular of a building or facility. The object is in particular a security camera, but it can also be a lamp, a fire detector or a motion detector, for example. The holding assembly comprises at least one holding device and at least one retaining pin connected to the object. The holding device is fastened to the ceiling or wall and the object is mounted on the holding device via the retaining pin.

For fastening the holding device to the ceiling or wall, the holding device comprises at least one fastening portion. The fastening portion can be, for example, a fastening plate having at least two holes such that the fastening plate is fastened to the ceiling or wall by means of screws passing through these holes. However, other fastening methods known to persons skilled in the art are also conceivable.

A receiving portion is arranged opposite the fastening portion. The fastening portion and the receiving portion are connected to each other in particular by a straight or angled connecting piece. The receiving portion is configured to receive, at least partially, the retaining pin. The retaining pin extends along a longitudinal axis and the receiving portion comprises a receiving axis. The retaining pin is preferably received in the receiving portion in such a way that the longitudinal axis and the receiving axis coincide. In particular, the object can be mounted on the receiving portion via the retaining pin so as to be suspended such that the longitudinal axis of the retaining pin is oriented vertically or approximately vertically.

The holding assembly is characterized in that the received retaining pin is secured in the receiving portion, at least against axial displacement, by means of a latching mechanism. In this context, axial is understood as meaning relative to the longitudinal axis of the retaining pin. In the case of suspended mounting, securing against axial displacement means securing against displacement in a vertical direction and thus securing the object against dropping down or securing the retaining pin from falling out of the receiving portion.

The latching mechanism latches when the retaining pin is introduced into the receiving portion, hence no further steps other than the introduction of the retaining pin into the receiving portion are necessary for suspended mounting and securing of the object against undesired dropping down. The object is therefore (pre-)mounted easily, quickly and securely by means of the holding assembly. Due to the fact that only the retaining pin has to be received in the receiving portion in order to mount the object, the object can also be mounted by one single person provided that said person is able to carry the object.

The retaining pin is advantageously at least partially rotationally symmetric, in particular about the longitudinal axis. As a result, it is unessential how the retaining pin is rotated about the longitudinal axis when the retaining pin is being introduced into the receiving portion. When introducing the retaining pin into the receiving portion, the rotation of the retaining pin and thus of the object can therefore be ignored, which makes the mounting of the object even easier and faster. Furthermore, the at least partially rotationally symmetric retaining pin makes it possible to turn the retaining pin and thus the object about the longitudinal axis after the retaining pin has been received by the receiving portion and secured against axial displacement by the latching mechanism. The object can therefore be precisely aligned even after the object has already been mounted and thus secured against dropping down. A receiving recess of the receiving portion, in which the retaining pin received in the receiving portion is located, is likewise at least partially rotationally symmetric, in particular about the receiving axis, and thus acts as a counterpart to the retaining pin.

It is advantageous if the latching mechanism has at least one latching element allocated to the receiving portion and at least one recess allocated to the retaining pin for receiving the latching element. As the latching mechanism engages, the latching element is received in the recess and thus produces an interlocking connection, which secures the retaining pin at least against axial displacement and thus the object against dropping down.

It is advantageous if the recess is in the form of a preferably circumferential groove, in particular an annular groove. In this context, circumferential is understood as meaning relative to the longitudinal axis of the retaining pin. Owing to the circumferential groove, after the latching mechanism is engaged in the recess the retaining pin and thus the object can still be turned about the longitudinal axis of the retaining pin in order to align the object.

Advantageously, the latching element is operatively connected to a spring and/or is a spring, in particular a wire spring. As the retaining pin is introduced into the receiving portion, the retaining pin pushes the latching element back against the spring tension of the spring. To make this easier, the retaining pin preferably has a chamfered surface, for example a bevel. When the latching element reaches the recess in the retaining pin, the latching element is then pressed by the spring tension into the recess such that the latching mechanism engages in a form fitting manner between the latching element and the recess. If the latching element is a wire spring, the latter is then preferably arranged tangentially to the receiving axis such that the engagement in the groove tangentially surrounding the retaining pin produces a good form fit and it is particularly easy to turn the retaining pin about the longitudinal axis.

It is advantageous if the receiving portion has a release mechanism capable of being operatively connected to the latching element in order to release the latching element engaged in the recess, thus enabling an eventual removal of the object. By means of the release mechanism, the latching element is pushed back out of the recess and the form fitting connection that was established by the latching element engaging in the recess is thus released. As an alternative, it is conceivable for the latching element to be accessible from outside and releasable by means of a suitable release tool.

It is advantageous if the release mechanism has a release ring, in particular one that can be rotated about the receiving axis, wherein at least one engagement element for engagement in the latching element and one actuation element for turning the release ring are arranged on the release ring. The latching element engaged in the recess is thus released simply by a rotating movement of the release ring. The actuation element can be, for example, a manually actuated lever or a hole in the release ring, wherein the rotating movement of the release ring is effected by a tool introduced into this hole. The engagement element(s) is/are configured in such a way that, with increasing rotation of the release ring rotated, it pushes/they push the latching element further out of the recess. The release mechanism is preferably furthermore configured in such a way that it returns to a non-release position when the actuation element is released so that the latching mechanism can instantly re-engage the next time that an object is mounted. The return to the non-release position can be effected by, for example, the spring tension of the spring.

The receiving portion advantageously comprises a clamping unit for clamping the retaining pin in the receiving portion. The clamping of the retaining pin in the receiving portion fixes it in the receiving portion. In particular, an alignment of the object set by turning the retaining pin and thus the object in the receiving portion can thus be fixed and secured against further rotation. Furthermore, the clamping of the retaining pin further secures the object against dropping down. The retaining pin preferably comprises a clamping portion, wherein the retaining pin can be clamped in this clamping portion by the clamping unit. A particularly good clamping effect of the clamping unit is thus achievable by a dedicated clamping portion.

It is advantageous if the clamping unit comprises a clamping screw. One end of the clamping screw can come in direct contact with the retaining pin, in particular with the clamping portion of the retaining pin. As an alternative to this, the contact with the retaining pin, in particular with the clamping portion of the retaining pin, is produced by a clamping element, which is operatively connected to the clamping screw. This is particularly advantageous in that the retaining pin will not be damaged during the clamping of the clamping unit if the clamping element does not turn as the clamping screw is turned.

It is advantageous if at least one adjustment joint for adjusting the alignment of the object is arranged between the retaining pin and the object. In particular, this adjustment joint can be used to adjust a rotation of the object about a vertical axis and/or an inclination of the object relative to the horizontal. The rotation of the object about a vertical axis can take place alternatively or additionally, for example as a fine adjustment, to the rotation of the retaining pin in the receiving portion. In the case in which the object is a security camera, for example, the adjustment is of particular significance because the area to be monitored is defined thereby.

The object can be rotated about a vertical axis and the object can be inclined relative to the horizontal in both directions by, for example, three swivel joints. However, due to space limitations among other things, preferably the rotation and the two inclinations can be performed with one single adjustment joint, for example a ball joint. To this end, the adjustment joint advantageously comprises a spherical shell segment-shaped joint head and a spherical shell segment-shaped joint socket, wherein the outer diameter of the joint head corresponds to the inner diameter of the joint socket and the joint head is arranged within the joint socket. The outside of the joint head and the inside of the joint socket are thus in contact with each other and the joint head is movable within the joint socket. All three movements (the rotation about a vertical axis and the inclination relative to the horizontal in both directions) can be carried out with this assembly. Preferably, the joint head is firmly connected to the retaining pin and the joint socket is firmly connected to the object, as this permits a lower overall height.

It is advantageous if the adjustment joint has a fixing device for fixing the adjusted alignment. The adjusted alignment therefore cannot be altered by, for example, the weight of the object or by external forces.

It is advantageous if the fixing device is made up of a fixing wedge and a transmission element. The fixing wedge is connected to the joint head so as to be movable between an adjustment position and a fixing position. In the adjustment position, the adjustment joint is therefore freely rotatable, whereas it is fixed in the fixing position. The fixing wedge is advantageously connected to the joint head by means of a screw such that the fixing wedge can be moved from the adjustment position into the fixing position and vice versa by tightening or loosening the screw. The transmission element is operatively connected to the fixing wedge and the joint socket such that, when the fixing wedge is in the fixing position, the joint head and the joint socket are connected to one another in a force fitting manner. This means that for fixing the adjusted alignment, the transmission element and the joint socket are clamped between the fixing wedge and the joint socket, which are connected to each other in the manner described above.

A method for suspended mounting of an object on a ceiling or wall by means of a holding assembly is also provided. The object is in particular a security camera, but it can also be a lamp, a fire detector or a motion detector, for example. The holding assembly is preferably configured according to the preceding description. According to the method, first a holding device of the holding assembly is fastened to the ceiling or wall with a fastening portion of the holding device. The fastening portion can be, for example, a fastening plate having at least two holes such that the fastening plate is fastened to the ceiling or wall by means of screws passing through these holes. However, other fastening methods known to persons skilled in the art are also conceivable. After the holding device has been fastened to the ceiling or wall, a retaining pin, which is connected to the object and extends along a longitudinal axis, is introduced into a receiving portion of the holding device.

The method is characterized in that the retaining pin is secured in the receiving portion, at least against axial displacement, by a latching mechanism. In this context, axial is understood as meaning relative to the longitudinal axis of the retaining pin. The retaining pin and consequently the object are therefore secured against displacement in a vertical direction, and the object is thus secured against dropping down. The latching mechanism engages when the retaining pin is introduced into the receiving portion, meaning that no additional steps other than the introduction of the retaining pin into the receiving portion are necessary for suspended mounting of the object and securing it against dropping down. The object can thus be mounted easily, quickly and securely by means of the holding assembly. Due to the fact that it is merely necessary to introduce the retaining pin into the receiving portion in order to mount the object, the object can also be mounted by one single person provided that said person is able to carry the object.

Advantageously, the retaining pin is clamped in the receiving portion by means of a clamping unit of the receiving portion. The mounted object is thus further secured against dropping down. Preferably, the retaining pin and thus the object can be rotated about the longitudinal axis of the retaining pin after the retaining pin has been introduced into the receiving portion and before the retaining pin is clamped in the receiving portion so as to achieve an initial alignment of the object. This initial alignment of the object is fixed by the clamping.

Lastly, it is advantageous if the alignment of the object is adjusted by means of at least one adjustment joint and the adjustment joint is preferably fixed with fixing means. The alignment of the object is preferably adjusted using the adjustment joint after the retaining pin has been introduced into the receiving portion and has been clamped in the receiving portion. In particular in the case in which the object is a security camera, a precise alignment of the object is especially important because the area monitored by the security camera is defined in this manner. The three possible movements (rotation of the object about a vertical axis and inclination of the object relative to the horizontal in two directions) can be carried out, for example, by means of three separate swivel joints or by means of a ball joint. As far as the desired alignment has been set, the adjustment joint(s) is/are then fixed by the fixing device in order to prevent an eventual undesired shifting of the alignment.

Further developments, advantages and possible applications of the invention will also emerge from the following description of exemplary embodiments and from the figures. All features described and/or illustrated, either alone or in any combination, are in principle subject matter of the invention, regardless of their references or how they are summarized in the claims. The content of the claims is also made a component of the description.

BRIEF DESCRIPTION OF THE DRAWINGS

The invention shall be explained in greater detail below, with reference to exemplary embodiments in conjunction with the drawings.

DETAILED DESCRIPTION OF THE INVENTION

In the figures, identical reference signs are used for elements of the invention that are the same or have the same function. For the sake of clarity, only the reference signs needed for describing the figure in question are illustrated in each figure.

Figure 1:
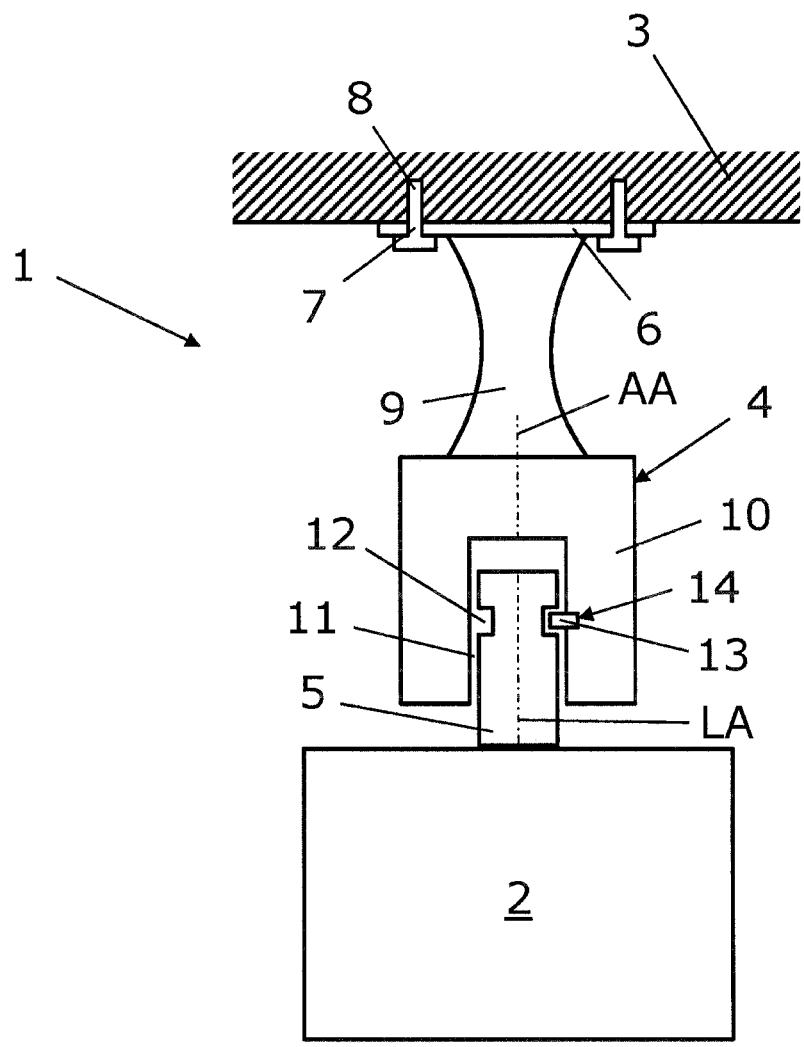
FIG. 1 is a schematic longitudinal section through a holding assembly according to the invention.

FIG. 1 shows a schematic longitudinal section through a holding assembly 1 for suspended mounting of an object 2 on a ceiling 3. The object 2 is in particular a security camera, but it can also be a lamp, a fire detector or a motion detector, for example. However, the holding assembly 1 according to the invention is preferably provided for suspended mounting of a security camera, in particular a security camera having multiple sensor units, in such a way that a 360° surveillance area can be monitored. The holding assembly 1 has a holding device 4 and a retaining pin 5, which is connected to the object 2.

The holding device 4 comprises a fastening portion 6 configured as a fastening plate, with which the holding device 4 can be fastened to the ceiling 3, preferably detachably, for example by means of a screw connection. For example, the fastening portion 6 has multiple holes or drilled holes 7, two of which are shown in FIG. 1 and through which the screws 8 are passed. The fastening portion 6 is fastened to the ceiling 3 by, for example, fastening means, for example, screws 8. Other variants of a fastening portion for fastening the holding assembly 1 to, e.g., rails and/or support elements situated on the ceiling, are also conceivable and are not shown here.

The fastening portion 6 is connected to a receiving portion 10 of the holding device 4 by an elongated connection piece 9, i.e., the fastening portion 6 and the receiving portion 10 are situated at opposite ends of the elongated connection piece 9. The receiving portion 10 configured for at least partially receiving the retaining pin 5 and for this purpose it comprises a receiving recess 11, into which the retaining pin 5 can be introduced along a receiving axis AA. In the mounted state, the retaining pin 5 is received, at least with its free end portion opposite the security camera, in the receiving recess 11 of the receiving portion 10. The receiving recess 11 is, for example, essentially rotationally symmetric relative to the receiving axis AA.

The retaining pin 5, which is firmly connected to the object 2, is received in the receiving portion 10 and extends along a longitudinal axis LA. The retaining pin 5 is preferably rotationally symmetric to the longitudinal axis LA. In the mounted state, the longitudinal axis LA of the retaining pin 5 received in the receiving portion 10 and the receiving axis AA of the receiving portion 10 coincide.

In order to secure the retaining pin 5 in the receiving portion 10 at least against axial displacement, i.e., displacement along the longitudinal axis LA of the retaining pin 5 or along the receiving axis AA of the receiving portion 10, and thus the object 2 against dropping down, the retaining pin 5 has a recess 12, which is configured as a groove tangentially surrounding the retaining pin 5, and the receiving portion 10 has a latching element 13. The recess 12 and the latching element 13 jointly form a latching mechanism 14, with which the retaining pin 5 is secured against axial displacement. To this end, the latching element 13 engages in the recess 12 so as to secure the retaining pin 5 against axial displacement by form fitting.

Although the latching element 13 is not shown in any further detail in FIG. 1, it is advantageous if the latching element 13 is operatively connected to a spring and/or is itself configured as a spring. The latching mechanism 14 can then engage automatically and thus secure the retaining pin 5 and the object 2 against axial displacement and thus against dropping down.

Mounting of the object 2 on the ceiling 3 is then carried out as follows. First the holding device 4 is fastened to the ceiling 3 with the fastening portion 6. This fastening by means of screws 8 or one of the alternative fastening methods are familiar to persons skilled in the art. The retaining pin 5, which is connected to the object 2, is then introduced, in the direction of its longitudinal axis LA, into the receiving portion 10 of the holding device 4. This can be done easily and quickly, also by one single person provided that one person is able to carry the object.

As the retaining pin 5 is introduced into the receiving portion 10, first the retaining pin 5 presses the latching element 13 back against a spring tension. When the latching element 13 reaches the recess 12 in the retaining pin 5, the latching element 13 is pressed by the spring tension into the recess 12, thereby producing [[an]] a form fitting connection between the retaining pin 5 and the receiving portion 10, which secures the retaining pin 5 against axial displacement and thus the object 2 against dropping down. The person mounting the object 2 therefore merely needs to introduce the retaining pin 5 into the receiving portion 10 until the latching mechanism 14 engages, which is easily and quickly done and also secure.

Figure 2:
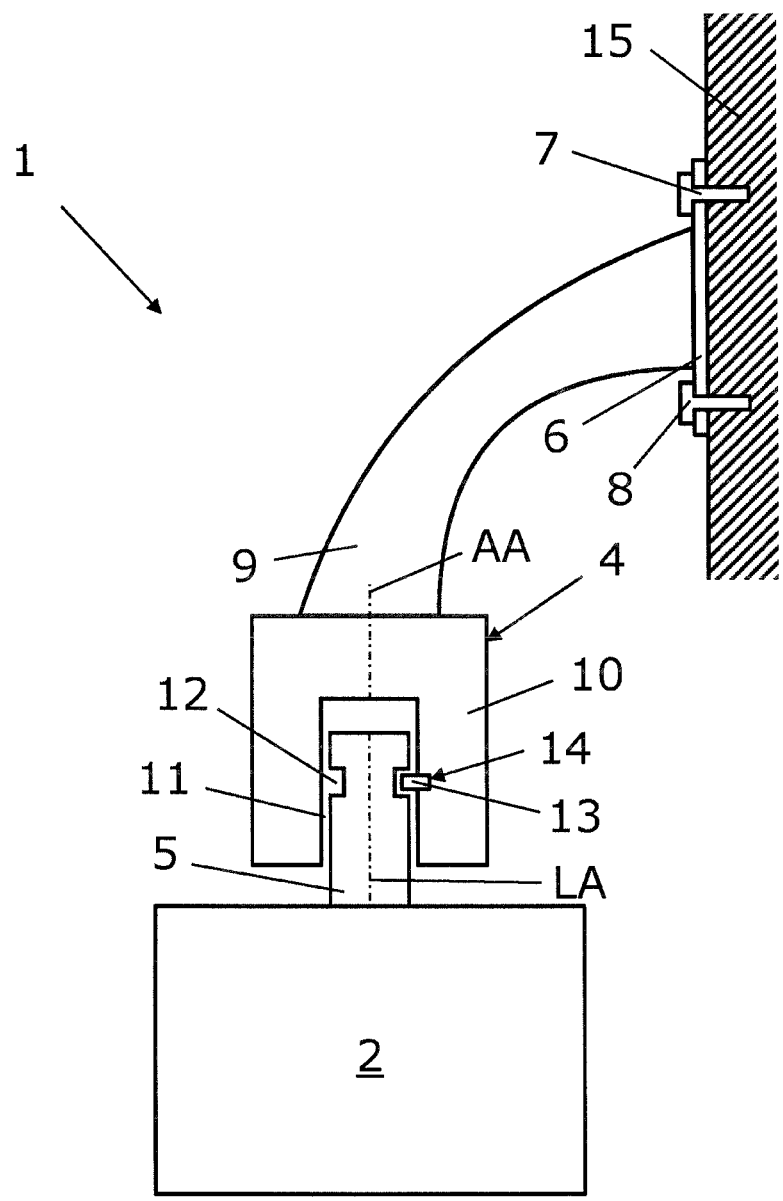
FIG. 2 is a schematic longitudinal section through another exemplary embodiment of a holding assembly according to the invention.

FIG. 2 shows a schematic longitudinal section through another exemplary embodiment of a holding assembly 1. In comparison to the holding assembly 1 of FIG. 1, this holding assembly is fastened to a wall 15 rather than to a ceiling 3. In this case as well, the fastening portion 6 comprises holes 7, through which screws 8, which fasten the fastening portion 6 to the wall 15, are passed. However, other fastening variants are also conceivable.

The connection piece 9, which connects the fastening portion 6 to the receiving portion 10, is angled in this exemplary embodiment, i.e., in proximity to the wall 15 it is horizontal and is thus perpendicular to the wall 15, further on it bends downwards until it is aligned vertically in the region of the receiving portion 10.

Whether the holding device 4 is fastened to the ceiling 3 as in FIG. 1 or to the wall 15 as in FIG. 2 depends in particular on the desired position of the object 2 and on the presence and location of the ceilings 3 and walls 15. Whether the holding device 4 is fastened to the ceiling 3 or to the wall 15 does not have any influence on the fastening of the object 2 in the receiving portion 10 by the retaining pin 5. However, a suspended holding or mounting of the object 2 by the holding assembly 1 according to the invention is common to both cases.

Figure 3:
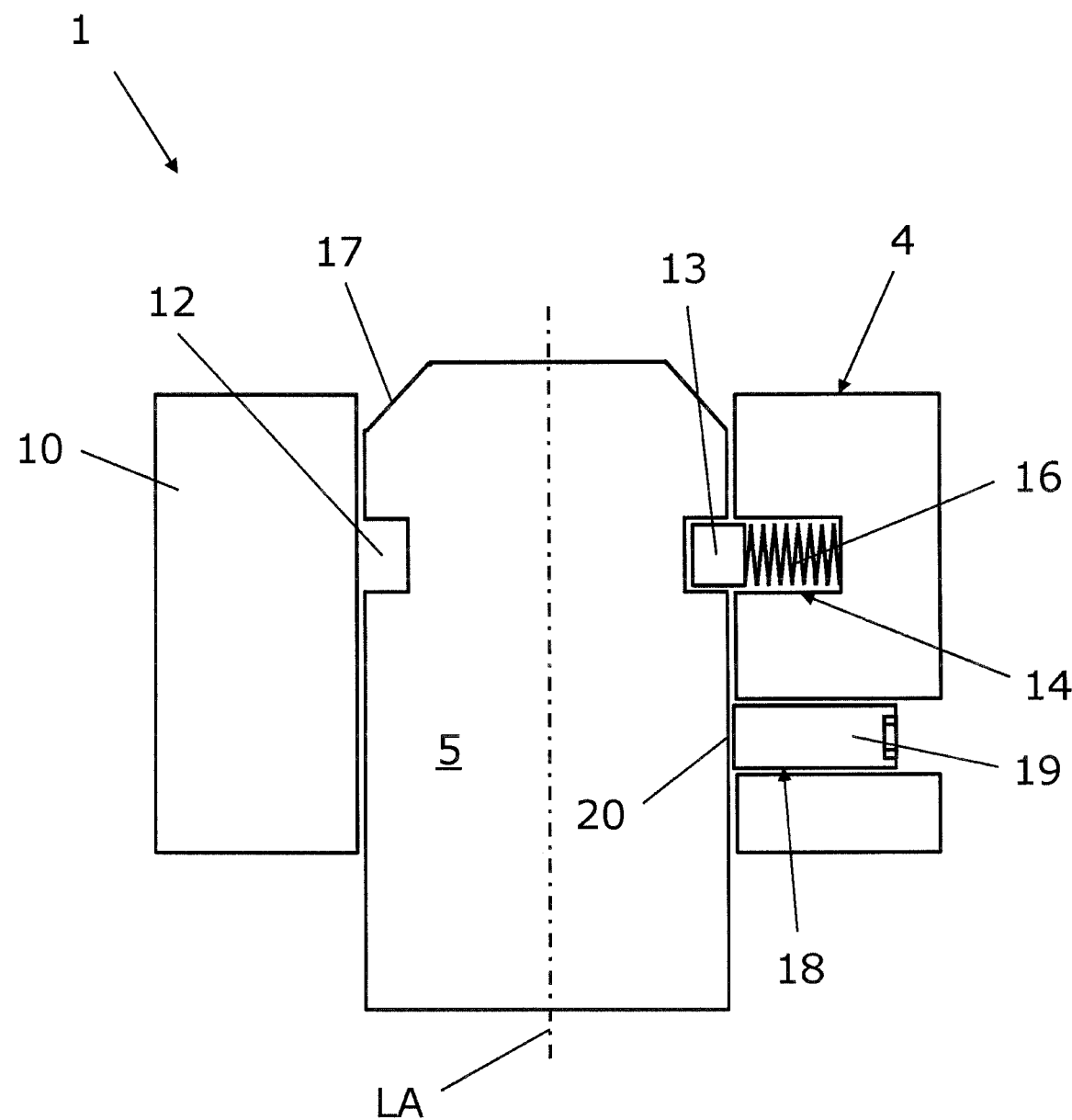
FIG. 3 is a schematic longitudinal section through a retaining pin received in a receiving portion.

FIG. 3 shows a schematic longitudinal section through a retaining pin 5 received in a receiving portion 10. Here it is shown in more detail that the latching element 13 is operatively connected to a spring 16, which is represented as a helical spring here and which is in turn connected to the receiving portion 10. As the retaining pin 5 is introduced into the receiving portion 10, the latching element 13 is first pressed into the receiving portion 10, thus compressing the spring 16. This is in particular simplified in that the retaining pin 5 has a bevel 17 on the end by which it is introduced into the receiving portion 10 such that the latching element 13 is gradually pressed in.

The receiving portion 10 also has a clamping unit 18, with which the retaining pin 5 can be clamped in the receiving portion 10. The clamping unit 18 comprises a clamping screw 19, which acts on the retaining pin 5 in a clamping portion 20. The clamping of the retaining pin 5 in the receiving portion 10 fixes the retaining pin 5, making it even more difficult for the object 2 to drop down. Furthermore, after the clamping the retaining pin 5 can no longer be rotated about its longitudinal axis LA, meaning that the alignment of the object 2 is fixed by the clamping by means of the clamping unit 18.

With the present holding assembly 1, it is thus possible to set and fix the alignment of the held object 2. After the introduction of the retaining pin 5 into the receiving portion 10, the retaining pin 5 is secured against axial displacement and the object 2 is thus secured against dropping down. Because the retaining pin 5 and the receiving recess 11 are rotationally symmetric, the retaining pin 5 and consequently the object 2 can still be rotated in the receiving portion 10 about the longitudinal axis LA of the retaining pin 5. The alignment of the object 2 can be adjusted by this rotation.

Once the desired alignment has been set, the clamping unit 18 is used to clamp the retaining pin 5 in the receiving portion 10 and thus fix the alignment of the object 2.

Figure 4A:
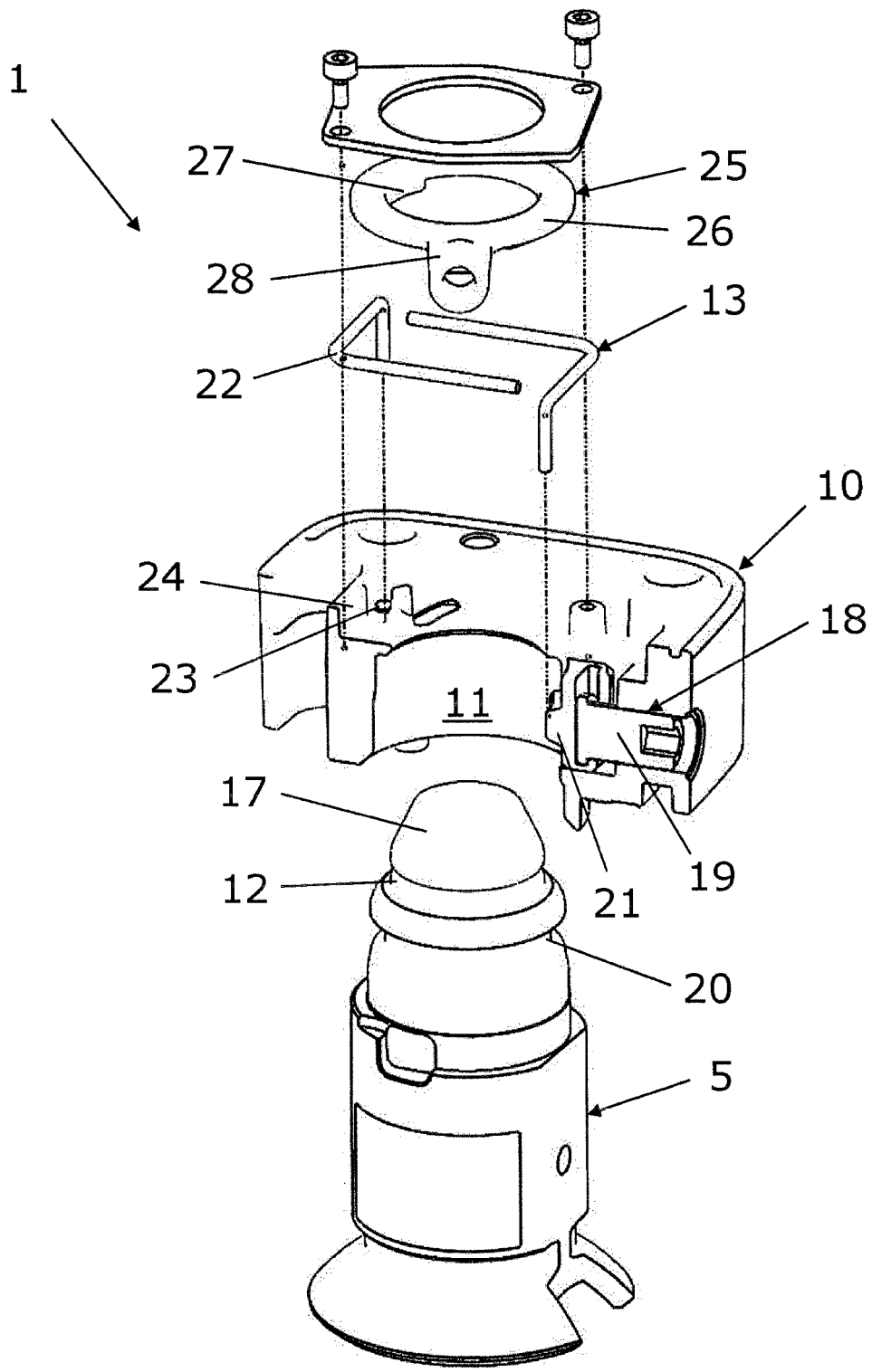
FIGS. 4a and 4b are a perspective exploded view drawing and a longitudinal section through still another exemplary embodiment of a holding assembly.
Figure 4B:
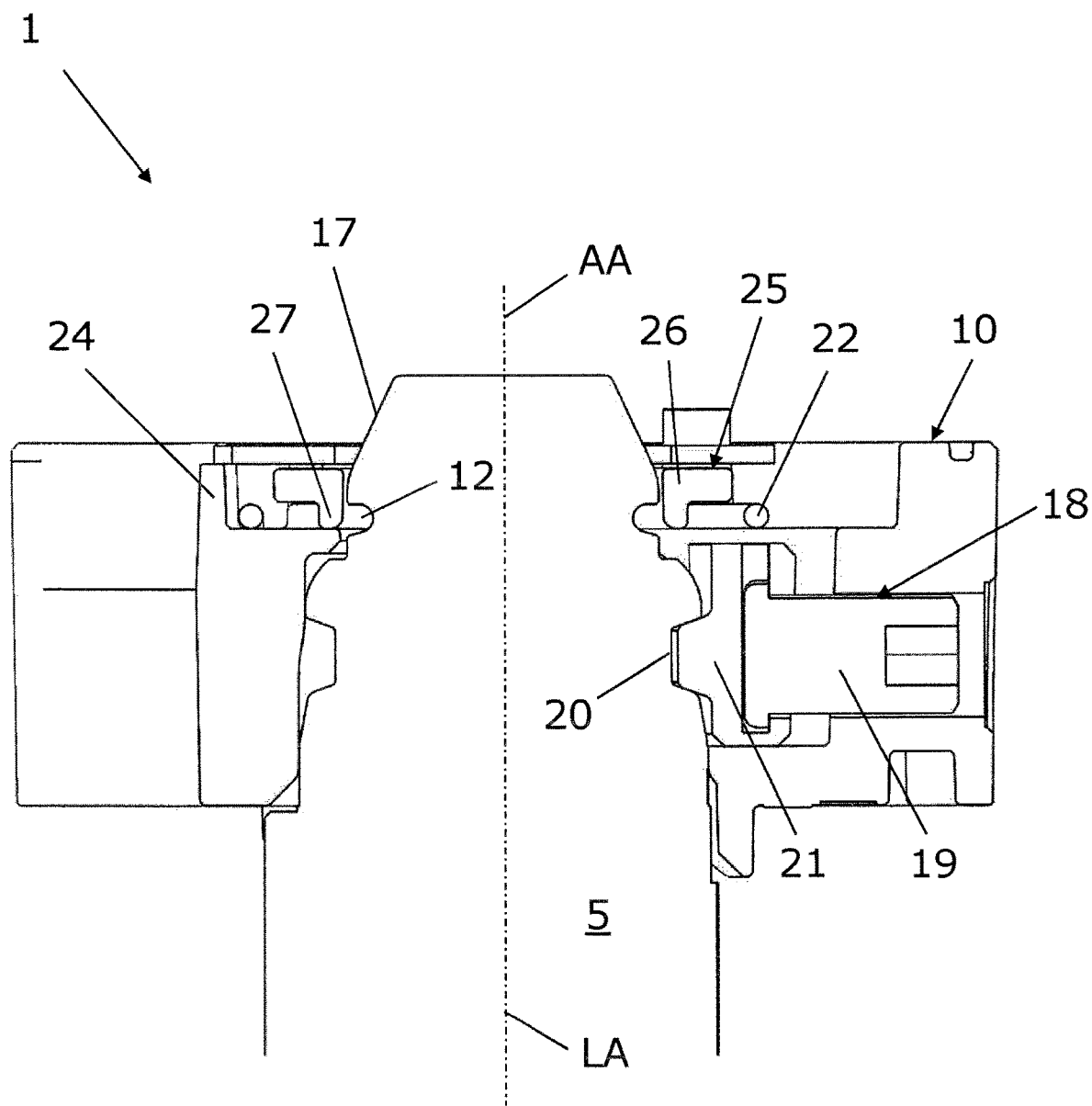

FIGS. 4a and 4b show yet another exemplary embodiment of a holding assembly 1 as a perspective exploded view drawing and as a longitudinal section through the holding assembly 1, respectively. For the sake of clear arrangement, only the receiving portion 10 of the holding device 4 is shown and neither the object 2 nor the connection of the retaining pin 5 to the object 2 are illustrated.

In comparison to the holding assembly 1 illustrated in FIG. 3, this holding assembly 1 has a clamping unit 18, which comprises a clamping element 21 in addition to the clamping screw 19. Hence, the clamping element 21 rather than the clamping screw 19 comes in contact with the retaining pin 5. The clamping element 21 is operatively connected to the clamping screw 19 such that, as the clamping screw 19 is screwed in, the clamping element 21 is moved toward the retaining pin 5 and is brought into contact with the retaining pin 5 until it exerts a pressure on the retaining pin 5, which effects the clamping of the retaining pin 5. If the clamping screw 19 is screwed out, first the pressure on the retaining pin 5 is released, the clamping element 21 is then brought out of contact with the retaining pin 5 and lastly moved away from the retaining pin 5. Because the clamping element 21 does not itself rotate as the clamping screw 19 is rotated but is merely moved perpendicularly to the longitudinal axis LA of the retaining pin 5 toward the retaining pin 5 or away from the retaining pin 5, only a pressure is applied to the retaining pin 5 and the retaining pin 5 is not subjected to rotary abrasion by the clamping screw 19.

The clamping portion 20 of the retaining pin 5 is configured as a groove surrounding the retaining pin 5 about the longitudinal axis LA thereof such that the clamping element 21 fits exactly in an area of the clamping portion 20. The retaining pin 5 and consequently the object 2 can therefore still be turned about the longitudinal axis LA. Owing to the configuration of the clamping portion 20 as a groove, the clamping of the retaining pin 5 not only achieves a force fit, but also [[an]] a form fit in an axial direction (relative to the longitudinal axis LA). The retaining pin 5 is thus particularly well secured against axial displacement and thus against falling out of the receiving portion 10.

The latching mechanism 14 comprises two latching elements 13, which are configured as wire springs 22 and are each bent twice by ca. 90°. One end of the wire spring 22 inserts in a drilled hole 23 extending parallel to the receiving axis AA such that this end of the wire spring 22 is fixed in the area of the drilled hole 23. The drilled hole 23 for the second wire spring 22 is arranged diametrically opposite the drilled hole 23 for the first wire spring 22. The other, free end of the wire spring 22 extends essentially tangentially to the receiving recess 11. The wire spring 22 is thus restricted in movement by bordering elements 24 of the receiving portion 10 in such a way that the free end of the wire spring 22 is pushed toward the receiving axis AA. When the retaining pin 5 is introduced into the receiving portion 10, first the free ends of the wire springs 22 are pushed away from the receiving axis AA by means of the bevel 17 of the retaining pin 5. When the groove-like recess 12 of the retaining pin 5 reaches the area of the wire springs 22, the free ends of the wire springs 22 engage in the groove-like recess 12 and secure the retaining pin 5 against axial displacement by form fitting.

Figure 5A:
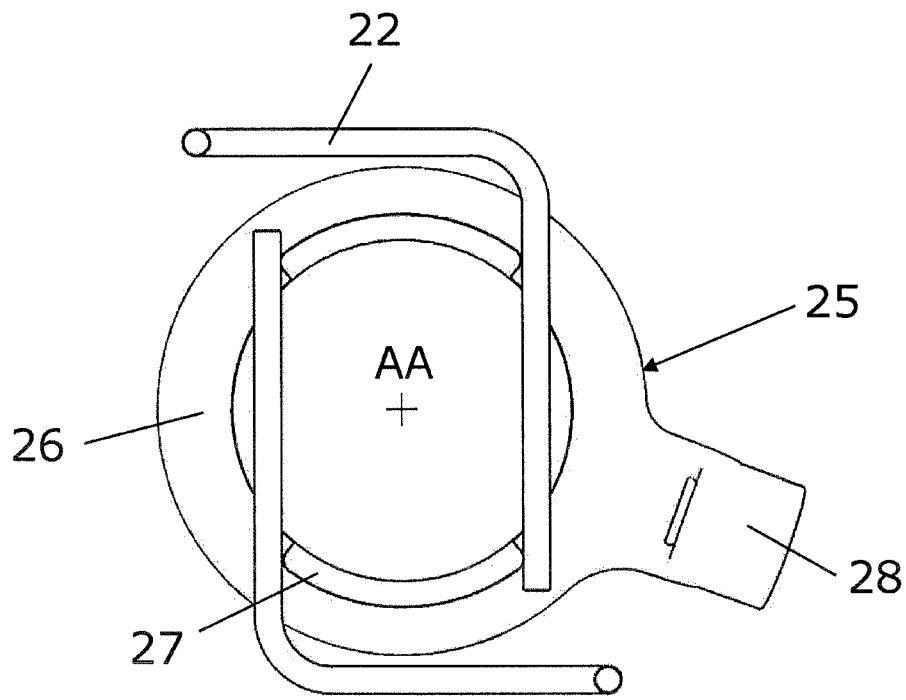
FIGS. 5a and 5b detailed views of the release mechanism of the holding assembly from FIGS. 4a and 4b.
Figure 5B:
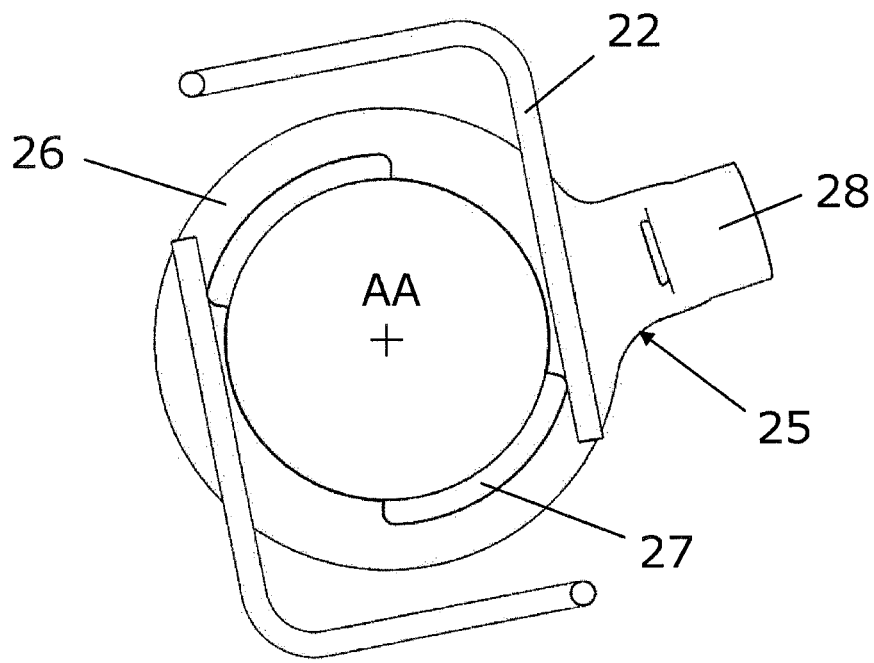

For the case in which the object 2 needs to be removed from the ceiling 3 or wall 15, the holding assembly 1 comprises a release mechanism 25, by means of which the wire spring 22 can be released from the groove-like recess 12. FIGS. 5a and 5b illustrate this release mechanism 25 in detail. The release mechanism 25 has a release ring 26, which can be rotated about the receiving axis AA. Preferably two engagement elements 27, which are essentially formed by ring segments, are arranged diametrically opposite each other on this release ring 26. For rotating the release ring 26, an actuation element 28, which is in the form of a sleeve or sleeve portion of the release ring 26 aligned radially to the receiving axis AA, is arranged on the release ring 26. For example, a stylus can be inserted into the actuation element 28 and used to rotate the release ring 26.

The working of the release mechanism 25 is illustrated in FIGS. 5a and 5b. In FIG. 5a, the wire springs 22 are shown in the position in which they are engaged in the groove-like recess 12 of the retaining pin 5. Only the ends of the engagement elements 27 are in contact with the wire springs 22. If the release ring 26 is rotated about the receiving axis AA using the actuation element 28, the point at which the engagement elements 27 contact the wire springs 22 then shifts in such a way that the wire springs 22 are pushed away or radially outwardly from the receiving axis AA, as illustrated in FIG. 5b. The wire springs 22 are ultimately pushed far enough away from the receiving axis AA such that the interlocking connection between the wire springs 22 and the groove-like recess 12 is released and the retaining pin 5 can be removed from the receiving portion 10. If the actuation element 28 is subsequently released, the release ring 26 is then returned to the starting position illustrated in FIG. 5a by the spring tension of the wire springs 22. The wire springs 22 are therefore closer to the receiving axis AA again and can re-engage in the recess 12 of the next retaining pin 5 that is introduced.

Figure 6:
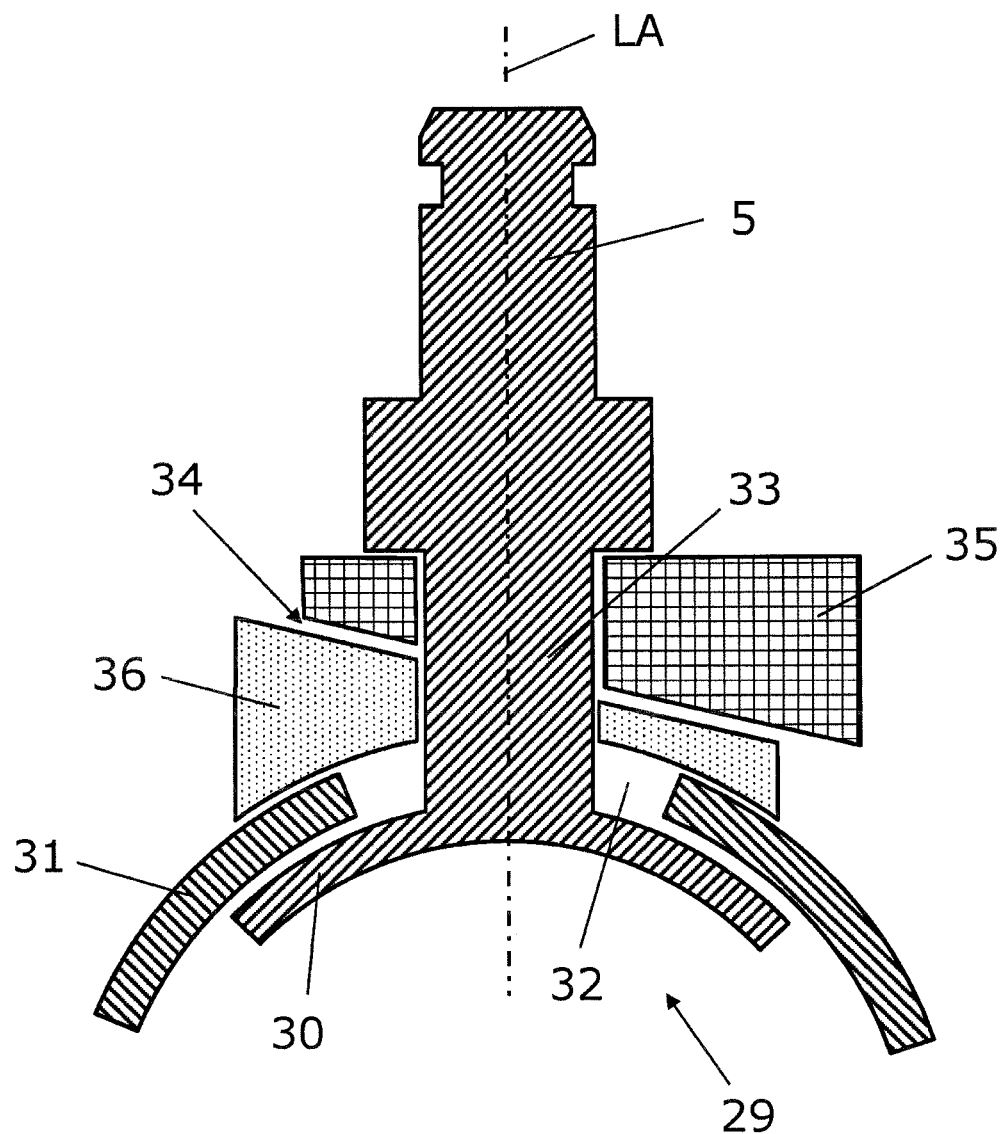
FIG. 6 is a schematic longitudinal section through a retaining pin and an adjustment joint.

FIG. 6 shows a schematic longitudinal section through a retaining pin 5 and an adjustment joint 29. The adjustment joint 29 is arranged between the retaining pin 5 and the object 2, which is not illustrated here. After the retaining pin 5 has been received in the receiving portion 10 and, if applicable, clamped by means of the clamping unit 18 in the receiving portion 10, the alignment of the object 2 can be precisely adjusted by means of the adjustment joint 29. In the case in which the object 2 is a security camera, the adjustment of the alignment of the object 2 means an adjustment of the spatial area monitored by the security camera.

The adjustment joint 29 is configured as a ball joint and comprises a spherical shell segment-shaped joint head 30 and also a spherical shell segment-shaped joint socket 31. The joint head 30 is firmly connected to the retaining pin 5 and the joint socket 31 is firmly connected to or integrally formed with the object 2. The inner diameter of the joint socket 31 corresponds to the outer diameter of the joint head 30, and the joint head 30 is arranged within the joint socket 31 in such a way that the outside of the joint head 30 is in contact with or can be brought into contact with the inside of the joint socket 31. An opening 32, through which a connection element 33 which connects the joint head 30 to the retaining pin 5 is guided, is also provided in the joint socket 31. By moving the joint head 30 relative to the joint socket 31, the positioning of the retaining pin 5 relative to the object 2 can be set and the selected alignment of the object 2 relative to the holding assembly can be adjusted.

To fix the selected alignment of the object 2, the adjustment joint 29 also has a fixing device 34. The fixing device 34 includes a fixing wedge 35 and a transmission element 36. The transmission element 36 is spherically concave on one of its sides such that the inner diameter of the transmission element 36 corresponds to the outer diameter of the joint socket 31. The transmission element 36 contacts the joint socket 31 with its spherical side, or can be operatively connected to the joint socket 31 thereby. The other side of the transmission element 36 is preferably formed by a flat surface, which can be brought into planar contact or planar frictional connection with the fixing wedge 35. To this end, the fixing wedge 35 likewise has a flat surface. The transmission element 36 is thus arranged between the joint socket 31 and the fixing wedge 35.

The fixing wedge 35 is movably connected to the connection element 33 and thus also to the joint head 30 and the retaining pin 5. The fixing wedge 35 is moved by means of, for example, a screw. In an adjustment position of the fixing wedge 35, a thinner region of the fixing wedge 35 is situated in the area of the longitudinal axis LA. The fixing wedge 35 thus exerts little or no pressure on the transmission element 36 such that the pressure between the transmission element 36 and the joint socket 31 as well as the pressure between the joint socket 31 and the joint head 30 is likewise absent or only slight. The joint head 30 can thus be moved in the joint socket 31 without little or no effort and the alignment of the object 2 can therefore be adjusted.

If the fixing wedge 35 is subsequently moved into a fixing position, then a thicker region of the fixing wedge 35 is situated in the area of the longitudinal axis LA. The fixing wedge 35 now exerts pressure on the transmission element 36, which in turn exerts pressure on the joint socket 31, whereby the joint socket 31 exerts pressure on the joint head 30. As a result of this pressure and the associated friction, the joint head 30 is connected in a force-fitting manner to the joint socket 31; in other words, the relative positions of the joint head 30 and the joint socket 31, and therefore also the alignment of the object 2, are fixed. In order to re-align the object 2, the fixing wedge 2 can be returned to the adjustment position, the object 2 can be re-aligned and the fixing wedge 35 can then be moved back into the fixing position.

Figure 7A:
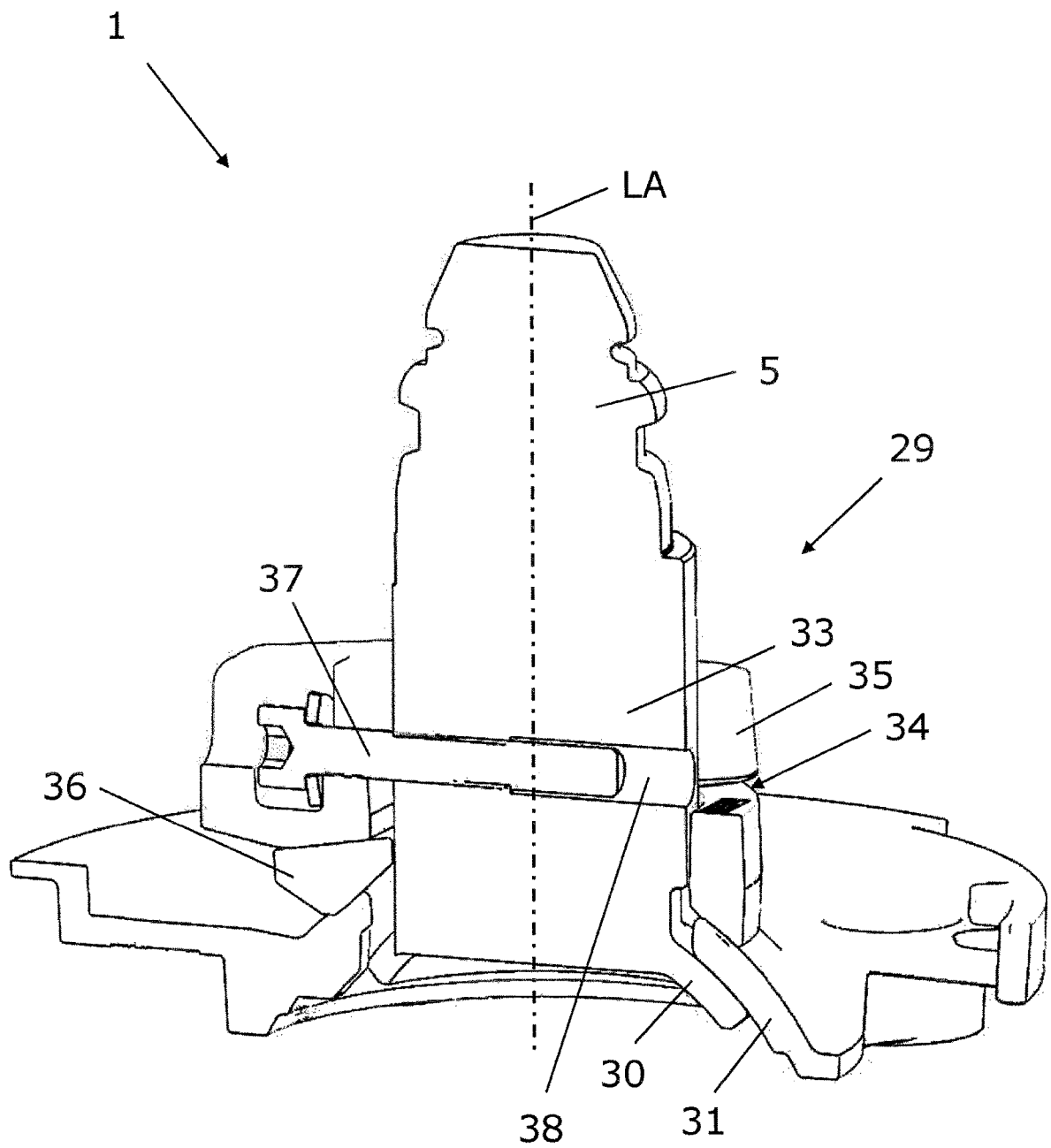
FIGS. 7a and 7b are a longitudinal section through and a perspective exploded view drawing of a further exemplary embodiment of a retaining pin and of an adjustment joint.
Figure 7B:
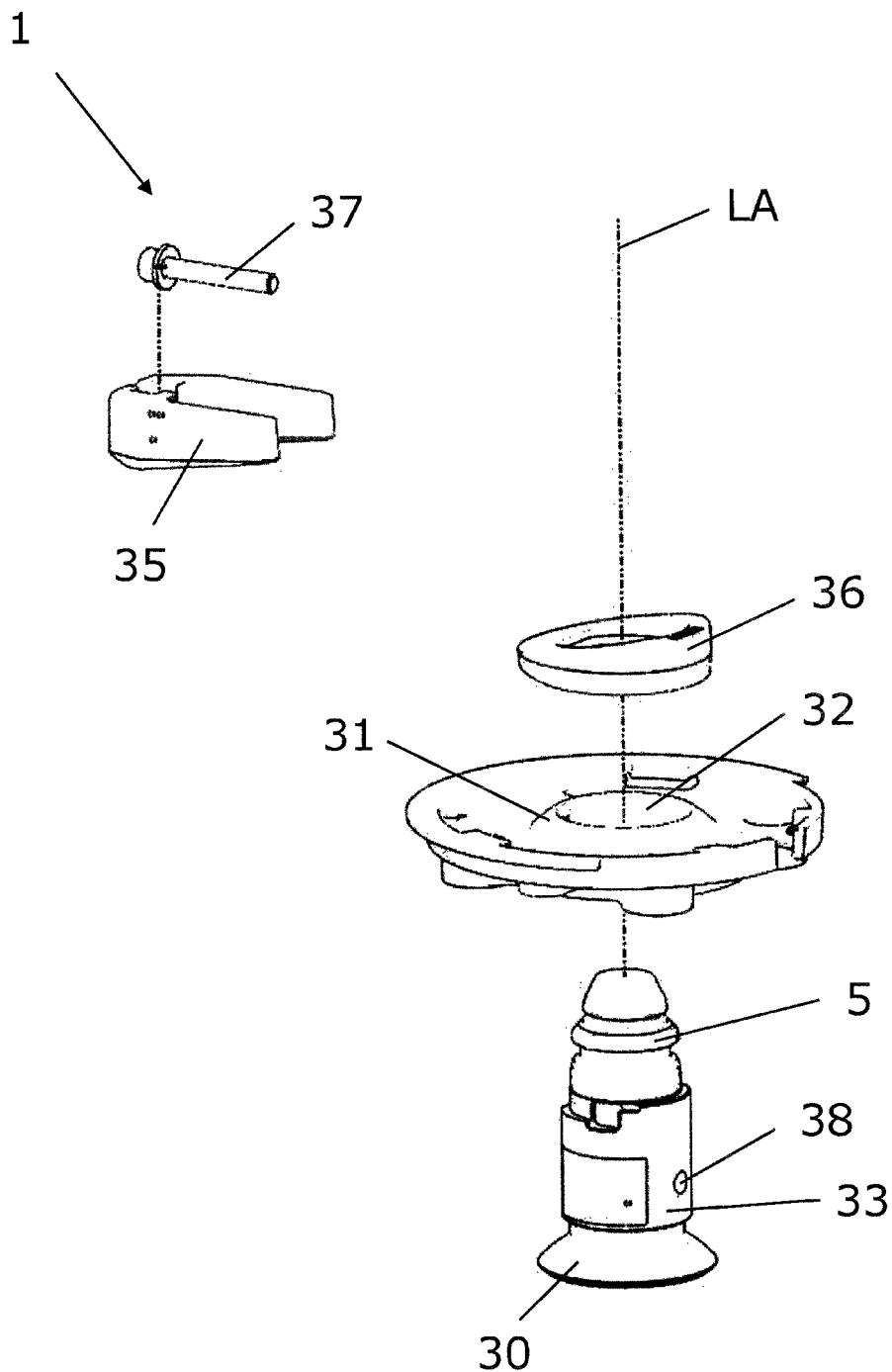

Another exemplary embodiment of a retaining pin 5 and adjustment joint 29 is illustrated in longitudinal section in FIG. 7a and in a perspective exploded view drawing in FIG. 7b. The fixing wedge 35 is U-shaped and thus surrounds the retaining pin 5. The fixing wedge 35 is moved by means of a fixing screw 37, which engages in a female thread 38 of the connection element 33. The fixing wedge 35 is moved from the adjustment into the fixing position and vice versa by turning the fixing screw 37. Accordingly, the alignment of the object 2 is adjusted and the adjustment is fixed simply by turning the object 2 and tightening the fixing screw 37, whereas the object 2 is secured against dropping down by the retaining pin 5, which is received and, if necessary, clamped in the receiving portion 10.

LIST OF REFERENCE SIGNS

1 Holding assembly
2 Object
3 Ceiling
4 Holding device
5 Retaining pin
6 Fastening portion
7 Hole
8 Screw
9 Connection piece
10 Receiving portion
11 Receiving recess
12 Recess
13 Latching element
14 Latching mechanism
15 Wall
16 Spring
17 Bevel
18 Clamping unit
19 Clamping screw
20 Clamping portion
21 Clamping element
22 Wire spring
23 Drilled hole
24 Bordering element
25 Release mechanism
26 Release ring
27 Engagement element
28 Actuation element
29 Adjustment joint
30 Joint head
31 Joint socket
32 Opening
33 Connection element
34 Fixing device
35 Fixing wedge
36 Transmission element
37 Fixing screw
38 Female thread
AA Receiving axis
LA Longitudinal axis

The invention claimed is:

1. A holding assembly for suspended mounting of a security camera on a ceiling or a wall, comprising at least one holding device and at least one retaining pin, which is connected to the security camera and extends along a longitudinal axis, wherein the at least one holding device comprises at least one fastening portion for fastening the at least one holding device to the ceiling or the wall, and a receiving portion, which is opposite the at least one fastening portion and has a receiving axis for at least partially receiving the at least one retaining pin, wherein the security camera is adapted to be mounted on the receiving portion so as to be suspended by the at least one retaining pin and wherein the at least one retaining pin received in the receiving portion is secured, at least against axial displacement along the receiving axis by a latching mechanism, and wherein at least one adjustment joint for adjusting alignment of the security camera is arranged between the at least one retaining pin and the security camera and the at least one adjustment joint is configured to adjust a rotation of the security camera about a vertical axis and an inclination of the security camera relative to the horizontal, wherein the receiving portion comprises a receiving recess, which is essentially rotationally symmetric relative to the receiving axis and into which the retaining pin is adapted to be introduced along the receiving axis and wherein the recess and a latching element jointly form the latching mechanism such that the latching element engages in the receiving recess so as to secure the retaining pin against axial displacement by form fitting and thus securing the suspended mounted security camera against falling down.

2. The holding assembly according to claim 1, wherein the retaining pin is at least partially rotationally symmetric, about the longitudinal axis and the receiving portion has a receiving recess that is at least partially rotationally symmetric, about the receiving axis.

3. The holding assembly according to claim 1, wherein the latching mechanism comprises at least one latching element allocated to the receiving portion and at least one recess allocated to the at least one retaining pin for receiving the latching element.

4. The holding assembly according to claim 3, wherein the recess is a circumferential groove or an annular groove.

5. The holding assembly according to claim 3, wherein the latching element is operatively connected to a spring or the latching element is a wire spring.

6. The holding assembly according claim 3, wherein the receiving portion comprises a release mechanism, which is operatively connected to the latching element in order to disengage the latching element engaged in the recess.

7. The holding assembly according to claim 6, wherein the release mechanism comprises a release ring that is rotatable about the receiving axis, wherein at least one engagement element for engaging in the latching element and an actuator element for rotating the release ring are arranged on the release ring.

8. The holding assembly according to claim 1, wherein the receiving portion comprises a clamping unit for clamping the retaining pin in the receiving portion and the retaining pin comprises a clamping portion, wherein the retaining pin is adapted to be clamped in the clamping portion by the clamping unit.

9. The holding assembly according to claim 8, wherein the clamping unit comprises at least one clamping screw.

10. The holding assembly according to claim 1, wherein the adjustment joint has a spherical shell segment-shaped joint head and a spherical shell segment-shaped joint socket, wherein an outer diameter of a joint head corresponds to an inner diameter of the joint socket and the joint head is arranged within the joint socket and the joint head is firmly connected to the at least one retaining pin and the joint socket is firmly connected to the security camera.

11. The holding assembly according to claim 10, wherein the adjustment joint has a fixing device for fixing adjusted alignment.

12. The holding assembly according to claim 11, wherein the fixing device comprises a fixing wedge and a transmission element, wherein the fixing wedge is connected to the joint head so as to be movable between an adjustment position and a fixing position and the transmission element is operatively connected to the fixing wedge and to the joint socket such that the joint head and the joint socket are connected to each other in a force-fitting manner when the fixing wedge is in the fixing position.

13. A method for suspended mounting of a security camera, on a ceiling or a wall by a holding assembly, the holding assembly comprising at least one holding device and at least one retaining pin, which is connected to the security camera and extends along a longitudinal axis, wherein the at least one holding device comprises at least one fastening portion for fastening the at least one holding device to the ceiling or the wall, and a receiving portion, which is opposite the at least one fastening portion and has a receiving axis for at least partially receiving the at least one retaining pin, wherein the security camera adapted to be mounted on the receiving portion so as to be suspended by the at least one retaining pin and wherein the at least one retaining pin received in the receiving portion is secured, at least against axial displacement along the receiving axis by a latching mechanism, and wherein at least one adjustment joint for adjusting alignment of the security camera is arranged between the retaining pin and the security camera and the adjustment joint is configured to adjust a rotation of the security camera about a vertical axis and an inclination of the security camera relative to the horizontal, wherein the receiving portion comprises a receiving recess, which is essentially rotationally symmetric relative to the receiving axis and into which the retaining pin is adapted to be introduced along the receiving axis and wherein the recess and a latching element jointly form the latching mechanism, the method comprising the steps of:

fastening the holding device of the holding assembly to the ceiling or the wall with the at least one fastening portion of the holding device, connecting the retaining pin to the security camera such that the retaining pin extends along a longitudinal axis, introducing the retaining pin into the receiving portion of the holding device, securing the retaining pin in the receiving recess of the receiving portion along the receiving axis, at least against axial displacement, by the latching mechanism; and engaging the latching element in the receiving recess so as to secure the retaining pin against axial displacement by form fitting and thus securing the suspended mounted security camera against falling down.

14. The method according to claim 13, wherein the retaining pin is clamped in the receiving portion by a clamping unit of the receiving portion.

15. The method according to claim 13, further comprising the step of adjusting alignment of the security camera to an adjustment joint and the adjustment joint is fixed with a fixing device.

* * * * *